United States Patent
Berge et al.

(10) Patent No.: US 10,762,811 B2
(45) Date of Patent: Sep. 1, 2020

(54) UNIVERSAL PROJECTOR

(71) Applicant: International Business Machines Corporation, Armonk, NY (US)

(72) Inventors: Layne A. Berge, Rochester, MN (US); Matthew Doyle, Chatfield, MN (US); Kyle Schoneck, Rochester, MN (US); Jason J. Bjorgaard, Rochester, MN (US); Thomas W. Liang, Rochester, MN (US); John R. Dangler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/206,318

(22) Filed: Nov. 30, 2018

(65) Prior Publication Data

US 2020/0175899 A1    Jun. 4, 2020

(51) Int. Cl.
*G06F 3/14* (2006.01)
*G09G 3/00* (2006.01)
*G09G 5/00* (2006.01)

(52) U.S. Cl.
CPC ........... *G09G 3/001* (2013.01); *G06F 3/1423* (2013.01); *G09G 5/006* (2013.01); *G09G 2370/12* (2013.01)

(58) Field of Classification Search
CPC .... G09G 3/001; G09G 5/006; G09G 2370/12; G06F 3/1423; G06T 7/13
See application file for complete search history.

(56) References Cited

U.S. PATENT DOCUMENTS

| | | | |
|---|---|---|---|
| 6,762,790 B1 * | 7/2004 | Matko | B60R 11/04 250/239 |
| 8,103,268 B2 | 1/2012 | Juric | |
| 9,826,572 B2 | 11/2017 | Garcia et al. | |
| 2013/0298011 A1 | 11/2013 | Chang et al. | |
| 2017/0006238 A1 * | 1/2017 | Kenzaburo | H04N 5/3765 |
| 2017/0301078 A1 * | 10/2017 | Forutanpour | G06T 7/0004 |
| 2017/0357212 A1 | 12/2017 | Guarini | |
| 2018/0218710 A1 * | 8/2018 | Park | G09G 5/10 |
| 2018/0315170 A1 * | 11/2018 | Mills | G06T 1/60 |

FOREIGN PATENT DOCUMENTS

CN     102183993 A     9/2011

OTHER PUBLICATIONS

The Hut, "Smartphone Projector—White", printed Jul. 29, 2018, 20 pages. https://www.thehut.com/gift-gadgets/smartphone-projector-white/11274753.html?affil=thggpsad&switchcurrency=USD&shippingcountry=US&gclid=EAlalQobChMI3duz7dH92QIVFp7ACh2t3goBEAQYAyABEgl2zPD_BwE&gclsrc=aw.ds&dclid=CLOp3PTR_dkCFdljHwodILAOig.

(Continued)

*Primary Examiner* — Robert J Michaud
(74) *Attorney, Agent, or Firm* — Jorge R. Maranto

(57) ABSTRACT

A system and a method for universally projecting an image on a display device to an outside device. The system includes a housing, a screen capture device, a serializer, and a display interface. Further, the system includes a sound capture device, and a bracket to secure the display device to the system. The method includes receiving an image of a display device, converting the image to a digital signal, serializing the digital signal, and transmitting the serialized digital signal to an outside device.

20 Claims, 4 Drawing Sheets

(56) References Cited

OTHER PUBLICATIONS

Best Buy, "Motorola—Moto Insta Share Projector—Black", printed Jul. 29, 2018, 3 pages. https://www.bestbuy.com/site/motorola-moto-insta-share-projector-black/5444300.p?skuId=5444300.

Mies, G., "First Look: Samsung's Galaxy Beam Android Phone with a Built-In Projector", PCWorld, Feb. 26, 2012, 4 pages. https://www.pcworld.com/article/250706first_look_samsungs_galaxy_beam_android_phone_with_a_built_in_projector.html.

* cited by examiner

UNIVERSAL PROJECTOR

BACKGROUND

The present disclosure relates to universal image projection, and more specifically, to a device that captures images on a display device for projection.

Modern display devices (e.g., cellphones, tablets, smartphones, laptops, e-readers, monitors) utilize a variety of ways of transmitting an image being displayed on a display device to an outside device. For example, data cables can be used to transfer information from one device to another. In other instances, devices can communicate wirelessly over a network or through a Bluetooth connection. However, the methods of transmission are dependent on the capabilities of the display device and if the manufacturer allows for the transmission to occur.

SUMMARY

Various embodiments are directed to a system for projecting images of a display device. The system can include a housing, a screen capture device, a serializer, and a display interface. The screen capture device is configured to capture images shown on the display device and is mounted to the housing. The serializer is electrically connected to the screen capture device and configured to serialize data received of the screen capture device. The serializer is also mounted to the housing. The display interface is electrically connected to the serializer and is configured to transmit the serialized data to an outside device. The display interface is also mounted to the housing. The system can also include a sound capture device that is electrically connected to the screen capture device and serializer and mounted to the housing. The sound capture device is configured to convert visual sound waves shown on the display device into a digital audio signal and to transmit the signal to the serializer.

Additional embodiments are directed to a method of projecting images of a display device. The method can include receiving an image of the display device by detecting light being emitted from the display device. The image received is the image displayed on the display device. The method can also include converting the image into a digital signal. The digital signal is a conversion of the image into digital information. The method can also include serializing the digital signal. The serialization alters the digital signal to a serialized digital signal to allow for transmission to an outside device. The method can also include transmitting the serialized digital signal to an outside device so that the image shown on the display device is shown on the outside device. The method can also include calibrating the image to account for color vision deficiency, detecting cracks on the display device and correcting display distortions caused by the cracks. The method can also include detecting defective pixels on the display device and accounting for the detected defective pixels. The method can also include comparing the image with the displayed image on the outside device, detecting differences between the image and the displayed image, and storing the differences detected.

BRIEF DESCRIPTION OF THE DRAWINGS

These and other features, aspects, and advantages of the embodiments of the disclosure will become better understood with regard to the following description, appended claims, and accompanying drawings where:

Figure 1:
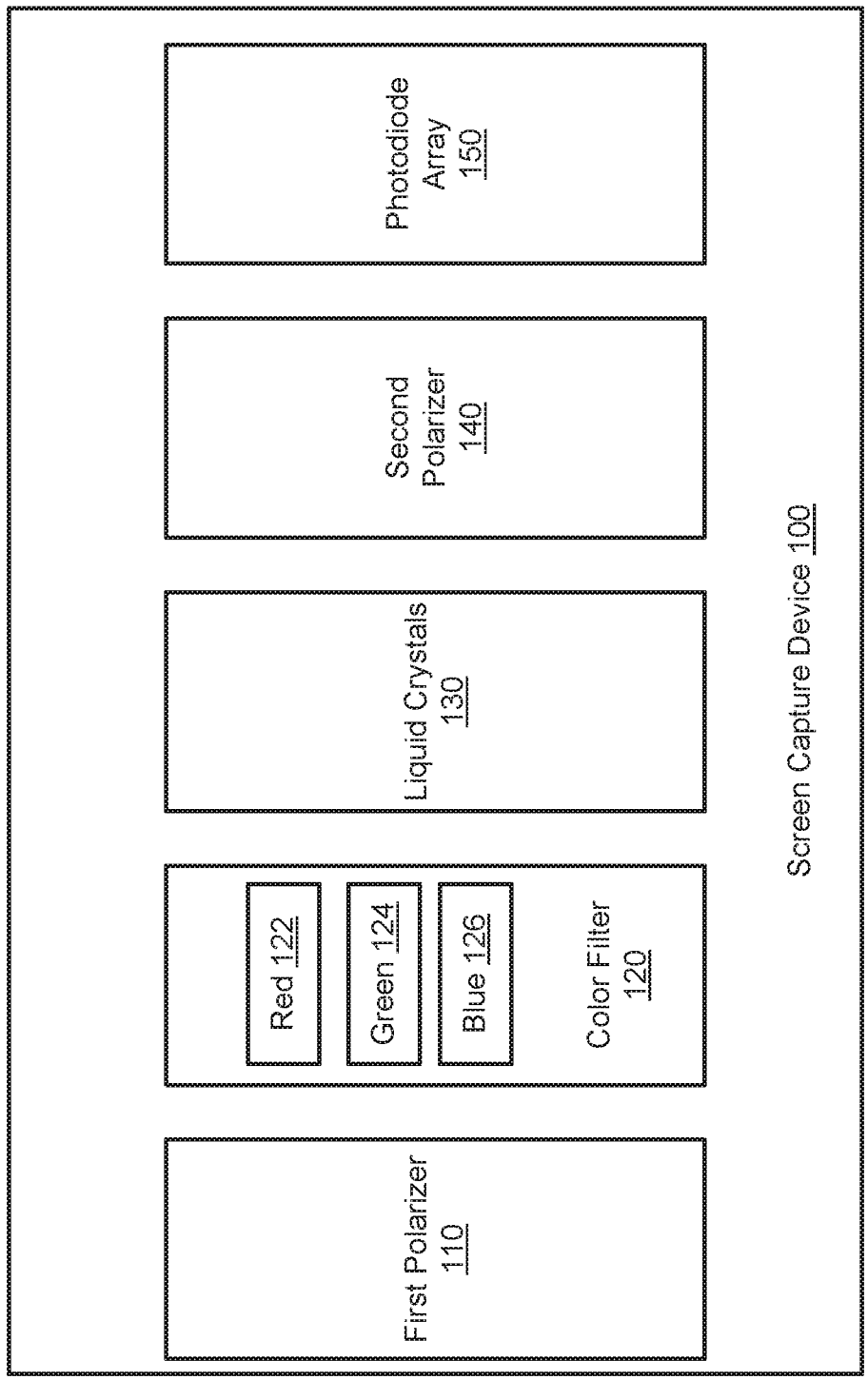
FIG. 1 is a block diagram illustrating a screen capture device, according to some embodiments of the present disclosure.

While the invention is amenable to various modifications and alternative forms, specifics thereof have been shown by way of example in the drawings and will be described in detail. It should be understood, however, that the intention is not to limit the particular embodiments described. On the contrary, the intention it to cover all modifications, equivalents, and alternatives falling within the spirit and scope of the invention. Like reference numerals are used to designate like parts in the accompanying drawings.

DETAILED DESCRIPTION

In the Summary above, in the Detailed Description, in the claims below, and in the accompanying drawings, reference is made to particular features (including process steps) of the disclosure. It is to be understood that the disclosure of the invention in this specification includes all possible combinations of such particular features. For example, where a particular feature is disclosed in the context of a particular aspect or embodiment, or a particular claim, that feature can also be used, to the extent possible, in combination with and/or in the context of other particular aspects and embodiments, and in the disclosure generally.

Image projection allows an image of one device to be displayed on another device. This feature can be useful for sharing a picture or video to another person or a group of people. It can also be used to view an image on a larger display or to give a presentation at a meeting. However, there is currently not a universal method or device available that allows an image on any display device to be projected to another device.

Projecting an image from one device to another device can be cumbersome, complicated, and at times, infeasible. Display devices, such as smartphones and tablets, offer various methods of image projection but suffer from a variety of complications. For instance, smartphones and tablets may require a proprietary cable for the specific device or may use specialized software to project and duplicate an image. Also, technological advancements in data transfer capabilities, as well as faster ways to deliver power, cause manufacturers to continuously change the type of connector used to connect a data transfer cable to a device. Consumers switching to a different device (e.g., smartphone or tablet) may also find themselves with an assortment of cables and accessories specific to a type of device that is not compatible with the different device.

Disclosed herein are a system and method for universally projecting images displayed on a display device to an outside device. The universal projector device allows for a display device to be placed onto the screen capture portion. Once placed, the screen capture portion captures the image of the display device by detecting the light being emitted. After the light is converted, the information is serialized which allows the universal projector to transmit the image captured to an outside device without the need for specialized cables, software, or any other type of hardware.

FIG. 1 is a block diagram illustrating a screen capture device 100. The screen capture device 100 includes a first polarizer 110, a color filter 120, liquid crystals 130, a second polarizer 140, and a photodiode array 150.

The first polarizer 110 is a light filter that allows for polarized light associated with the polarization of the first polarizer 110 while blocking light waves of other polarizations. The first polarizer 110 is disposed between a front glass panel and the color filter 120. The orientation of the polarization is perpendicular to the polarization related to the second polarizer 140. As light passes through the first polarizer 110, the light becomes polarized and is passed through to the color filter 120.

The color filter 120 is a filter that separates the polarized light that has passed through the first polarizer 110 into color spectrums of red, green, or blue at a per-pixel basis. As it relates to positioning, the color filter 120 is disposed between the first polarizer 110 and the liquid crystals 130 layer. The color filter 120 is used to filter wavelengths of light associated with particular colors that are not intended to strike the underlying components. As the light is filtered, the red, blue, and green regions are arranged in a predetermined pattern that corresponds to each pixel in the photodiode array 150. In some embodiments, the color filter 120 includes a separate blue filter 126, a red filter 124, and a green filter 124, along with other suitable layers of material.

The liquid crystals 130 is a layer of liquid crystals manipulated by applying appropriate voltage to the layer. Positioned between the color filter 120 and the second polarizer 140, the liquid crystals are oriented to allow only particular colors to pass through. As light from the color filter 120 passes to the liquid crystals, the crystals are reoriented to allow light to pass through the second polarizer 140. The type of liquid crystal technology can vary depending on the manufacturing preference. For example, the liquid crystal layer can be twisted nematic, in-plane switching, super in-plane switching, vertical alignment, or any other type of liquid crystal layer available.

The second polarizer 140 is a light filter that allows for polarized light associated with the polarization of the second polarizer 140 while blocking light waves of other polarizations. The second polarizer 140 is disposed between the liquid crystals 130 and the photodiode array 150. The orientation of the polarization is perpendicular to the polarization related to the first polarizer 110, such that no light would pass through the second polarizer 140 unless the light is reoriented by the liquid crystals. As light passes through the second polarizer 140, the light becomes polarized and is passed through to the photodiode array 150.

The photodiode array 150 is an optical sensing array configured to convert light into an electrical current. In some embodiments, the photodiode array 150 comprises an array of contiguous photo-sensing elements or individual photodiodes. The photodiode array 150 is disposed between the second polarizer 140 and configured to be electrically connected to other components within a system. Each of the photodiodes has a light receiving surface that faces toward the second polarizer 140. As light is received by the photodiode array 150, the light into an electrical current and the array is configured to output an electrical signal that depends on the intensity of the received light. As the electrical signal is created by the photodiode array 150, an analog to digital converter (ADC) converts the analog voltage to a digital output signal.

Figure 2:
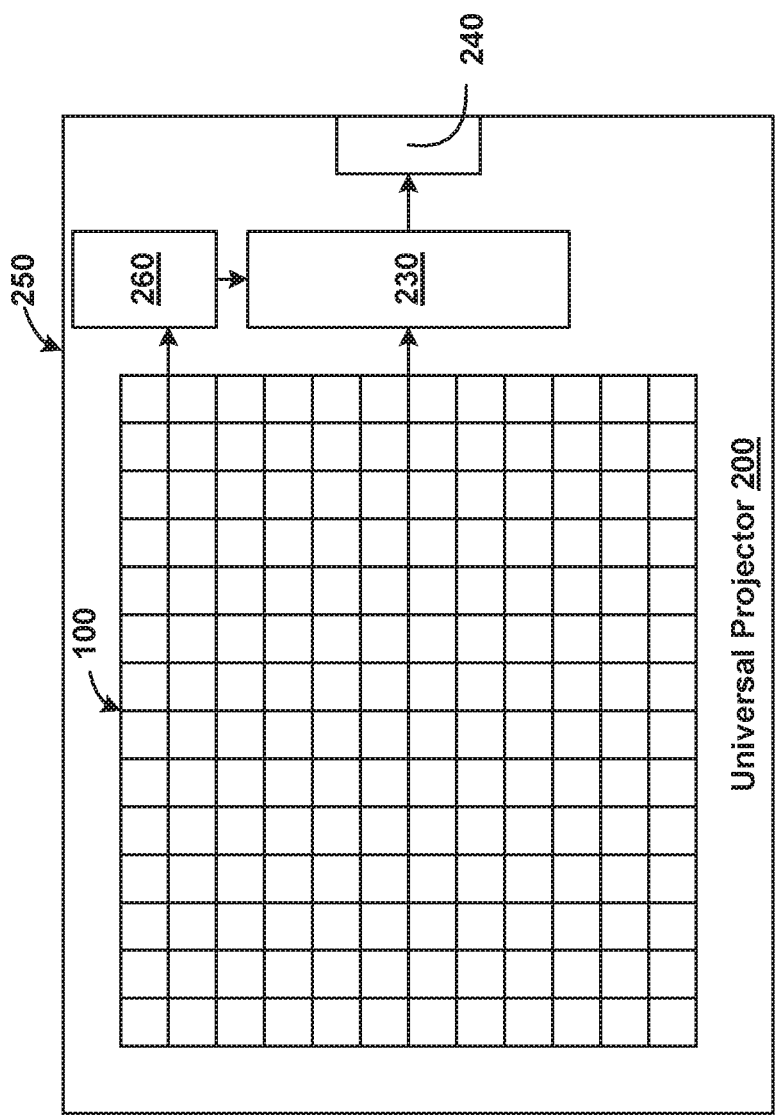
FIG. 2 is a block diagram illustrating a universal projector system, according to some embodiments of the present disclosure.
Figure 2:
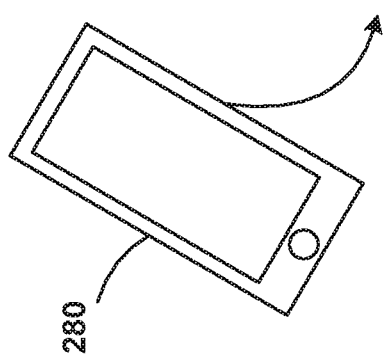

FIG. 2 is a block diagram illustrating a universal projector 200 system. The universal projector 200 system includes a screen capture device 100, a serializer 230, a display interface 240, a housing 250, and a sound capture device 260. Also included in FIG. 2 is a display device 280. To illustrate the universal projector 200 system but not to limit embodiments, FIG. 2 is described within the context of the screen capture device 100 of FIG. 1. Where elements described with respect to FIG. 2 are identical to elements show in FIG. 1, the same references numbers are used in both Figures.

Components enclosed within the housing 250 include, the screen capture device 100, the serializer 230, and the display interface 240. The screen capture device 100 is contained within the housing 250 to allow for the display device 280 to be placed onto the surface of the screen capture device 100.

The serializer 230 is configured to convert a received digital signal to a serialized digital signal. The serializer 230 is electrically connected to the screen capture device 100 and is configured to receive and serialize the data of the screen capture device. 100. As the serialization of data occurs, the serializer 230 is also configured to transmit the serialized digital signal to the display interface 240. In various embodiments, the serializer is configured to output one or more streams of serialized data output, such that the serializer is configured to transmit one or more serialized digital signal streams to at least one display interface and other streams to other components. In some embodiments, the universal projector 200 is configured to capture static images (e.g., photographs, screenshots, slide show images, etc.), and the serializer 230 is configured to convert the data of the static image into a serialized digital signal. In other embodiments, the universal projector 200 is configured to capture dynamic images (e.g., videos, GIFs, etc.) and the serializer 230 is configured to continuously stream the digital signal received into a serialized digital signal such that the outside device is capable of displaying the dynamic image.

While various types of serializers exist, any design of a serializer capable of converting data input to serialized data output can be used for the serializer 230. In one embodiment, the serializer 230 is a plurality of serializers connected to receive parallel data input from one or more corresponding photodiode arrays and is configured to convert the parallel data input to a serialized data output.

The display interface 240 (e.g., display port, HDMI, DVI, Thunderbolt®, USB, or similar) provides for the communication of display data between the universal projector 200 and an outside device. In other words, the universal projector 200 can transmit a serialized digital signal, created by the universal projector, to an outside device using the display interface 240. Display data transmitted by the display interface 240 includes information corresponding to pixels of the display which allows the outside device to display an image (e.g., LCD screen, projector, etc.). The display interface 240 is electronically connected to the serializer 230 and is configured to transmit the serialized digital signal sent by the serializer. In some embodiments, multiple outside devices receive display data from the universal projector 200 through the display interface 240. For example, the universal projector 200 can have multiple display interface types that allow for transmission of display data to each outside device connected to the universal projector 200 through the various display interface ports.

The sound capture device 260 is a component of the universal projector that analyzes and captures visual sound waves detected on the image captured by the screen capture device 100. The sound capture device 260 is electronically connected to the screen capture device 100 as well as the serializer 230. If a visual sound wave is detected, the sound capture device 260 converts the visual sound wave into a digital audio signal. The digital audio signal is sent to the serializer 230 to be serialized for transmission. In some embodiments, a portion of the display device 280 is dedicated to displaying a visual sound wave. The visual sound wave as referred herein is a visual representation of a sound wave. For example, the upper one third of the display can show the visual sound wave in order to transmit the corresponding audio with the image being displayed. In some embodiments, the visual sound wave is displayed on the display device 280 with undetectable light waves. For example, ultraviolet of infrared light can be used to transmit the visual sound wave in order to allow the entire display to be used for the image that is to be projected.

The display device 280 is a display device that displays visual information on a screen. Some examples of a display device include a smartphone, tablet, laptop, e-reader, televisions, and monitors. Typically, LCD technology is used as a means for displaying images on display devices. However, defective pixels can occur which prevents the individual pixels from properly displaying the correct color. For example, defective pixels can include defects such as dark dot defects, bright dot defects, and partial sub-pixel defects. To account for pixel defects, some embodiments of the disclosure include defective pixel correction. For example, as the image of the display device is captured by the universal projector, the collected image is analyzed to detect anomalies such as a pixel displaying a color dissimilar to the surrounding colors. In some embodiments, the image with defective pixel is adjusted by altering the color to a color similar to the surrounding colors around the defective pixel. For example, if an image captured has a defective pixel displaying a color yellow and the surrounding colors of the pixel are red, the image is adjusted to change the yellow pixel to red. As such, the detected defective pixel is transformed to match the similar surrounding colors.

The universal projector detects, captures, and transmits an accurate color representation of the colors displayed on a display device. However, some embodiments include the ability of the universal projector to account for color vision deficiencies in potential viewers. In some embodiments, the universal projector adjusts the colors captured based on the type of color deficiency of the individual. For example, the color vision deficiency can be deuteranopia, tritanopia, or protanopia. Once an individual manually sets the vision deficiency type, the universal projector can detect the various colors on the image being captured and alter the color in such way as to allow the individual to perceive those colors. In some embodiments, the universal projector is configured to allow for color adjustments to be done manually by an individual or operator.

Display devices displays can become cracked which can create distortions as the image is being captured by the universal projector. The cracks can cause light being emitted from the display device to be distorted and as such, cannot be correctly captured by the universal projector. To account for instances when a display device with a cracked screen is used in tandem with the universal projector, some embodiments include image correction based on accounting for cracked displays. For example, the universal projector 200 can analyze the image captured to determine whether a distortion exists. The distorted pixels can then be altered to match the colors of the surrounding pixels that do not have the distortion.

In some embodiments, a bracket is connected to the housing along the perimeter of the screen capture device 100. The bracket is mounted adjacent to the screen capture device 100 and in such a way to allow for the display device 280 to face away from an outside device that an image is being transmitted to. This orientation allows for display devices that have cameras on the back of the device to record what is displayed on the outside device. The bracket also securely holds the display device 280 to the universal projector 200 so that the display device 280 does not move or slide during the capturing process.

Figure 3:
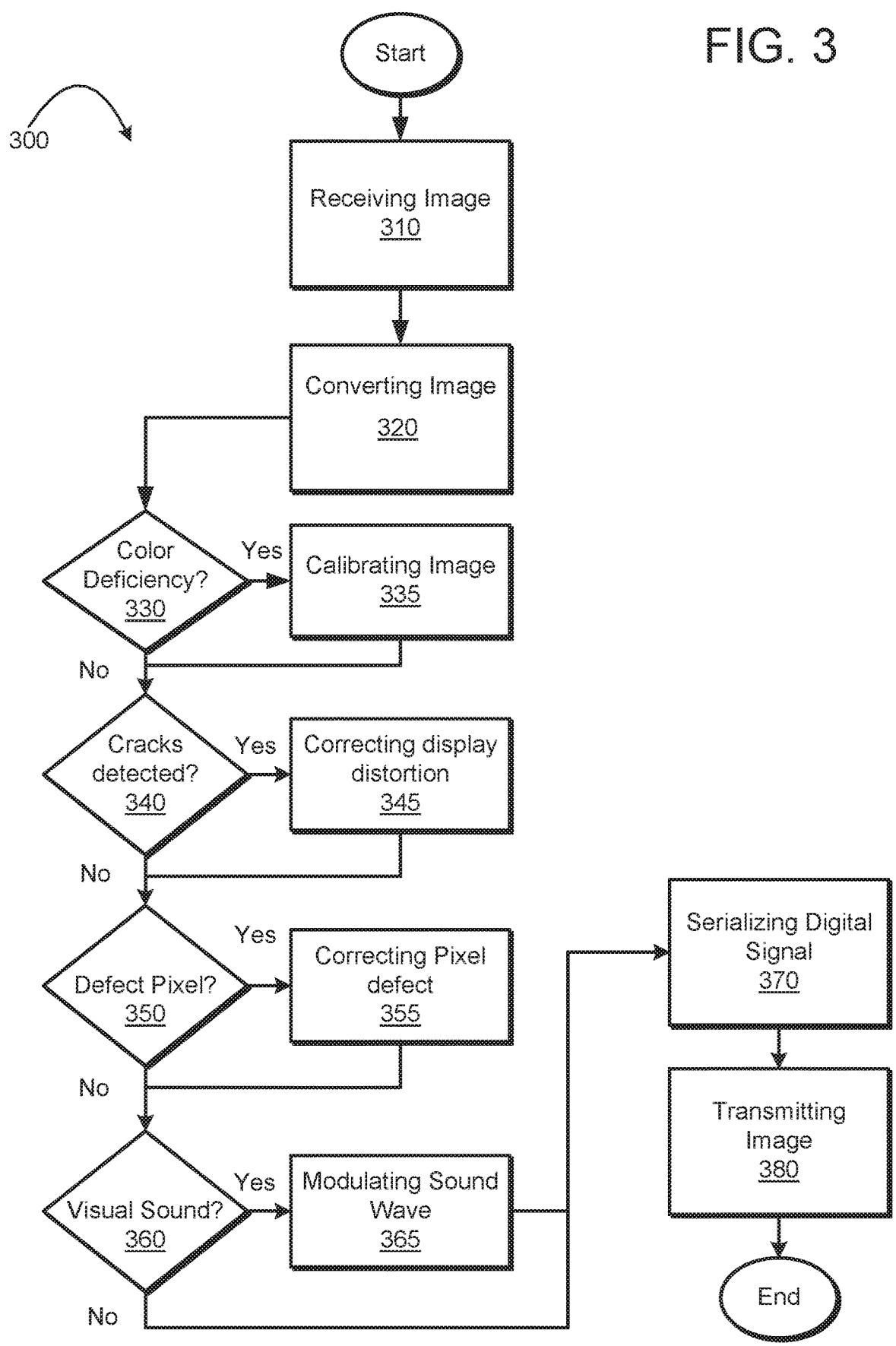
FIG. 3 is a flow diagram illustrating a process of capturing an image and transmitting the image, according to some embodiments of the present disclosure.

FIG. 3 is a flow diagram illustrating a process 300 of capturing an image on a display device and transmitting the image to an outside device, according to some embodiments of the present disclosure. To illustrate process 300, but to not limit embodiments, FIG. 3 is described within the context of a screen capture device 100 in FIG. 1 and a universal projector 200 in FIG. 2. Where elements described with respect to FIG. 3 are identical to elements shown in FIG. 1 and FIG. 2, the same reference numbers are used in both Figures.

An image from the display device 280 is received by the screen capture device 100. This is illustrated at step 310. The image that is received is the image that is displayed on the display device. In some embodiments, the image is a static image (e.g., a photograph, screenshot) that the screen capture device 100 detects. For example, if the display device is a smartphone, the image received can be the home screen of the display device or a stored picture. In some other embodiments, the image is a dynamic image (e.g., video, GIF). For example, the display device can display video content and the screen capture device can continuously capture the image as the video plays. As such, the image can be any image that is capable of being displayed on a display device.

As the photodiode array 150 receives the light from the display device, the electrical signals are converted to a digital signal. This is illustrated at step 320. In some embodiments, an ADC electrically connected to the photodiode array 150 performs the conversion. It should be noted that various ADCs exist and perform the analog to digital conversion in various ways. Any ADC capable of converting the signal from the photodiode array 150 can be used to perform step 320.

Once the image is received, the screen capture device 100 checks to determine if a color vision deficiency preference has been selected. This is illustrated at step 330. If a color vision deficiency preference has been selected, the screen capture device 100 recalibrates the received image to correspond to the selected preference. This is illustrated at step 335. In some embodiments, the color calibration is performed automatically. In other embodiments, a user can toggle whether or not to recalibrate the colors.

If no color vision deficiency preferences have been set, or once the received image has been calibrated, the process 300 proceeds by determining whether cracks are detected on the display device 280 transmitting the image to the screen capture device 100. This is illustrated at step 340. If a crack is detected, the screen capture device 100 corrects the distortions in the image created by the cracks. This is illustrated at step 345. In some embodiments, the distortions detected are from other abnormalities on the screen of the display device 280. For example, the distortions can be from a warped screen, residue, or various types of debris left on the screen. The distortion is corrected on the received image by altering the distorted pixels colors to match the color of the surrounding pixels.

If no cracks are detected on the display device 280, or once the corrections to the distortions on the received image have been made, the process 300 proceeds by determining whether defective pixels are detected on the screen of the display device 280. This is illustrated at step 350. If a defective pixel is detected, the screen capture device 100 accounts for the defective pixels by altering the color received to match the surrounding colors of the detected defective pixel. This is illustrated at step 355. The defective pixel detected need not be a defective pixel on the display device. In some embodiments, the defective pixel detected is an error conducted during the capturing process.

If no defective pixels are detected on the display device 280 or after the defective pixels detected have been altered, the process 300 proceeds by detecting whether a visual sound wave is displayed on the display device 280. This is illustrated at step 360. If a visual sound wave is detected in the received image, the visual sound wave is modulated into an audio signal. This is illustrated at step 365. In some embodiments, the modulation occurs simultaneous as the visual sound waves are detected by the screen capture device 100.

If no visual sound waves have been detected, or when the visual sound waves have been modulated, the process 300 proceeds by serializing the digital signal. This is illustrated at step 370. In some embodiments, the serialization serializes the digital signal of the image and the digital sound signal into a singular serialized digital signal. For example, the screen capture device 100 can capture a video being played and a visual audio signal corresponding to the video. The video signal and the audio signal are converted into one signal that can be transmitted out.

Once the signal is converted into a transmittable serialized digital signal, the process 300 proceeds by transmitting the signal to an outside device. This is illustrated at step 380. The transmission continues until the screen capture device ceases to capture the image displayed on the display device 280.

Figure 4:
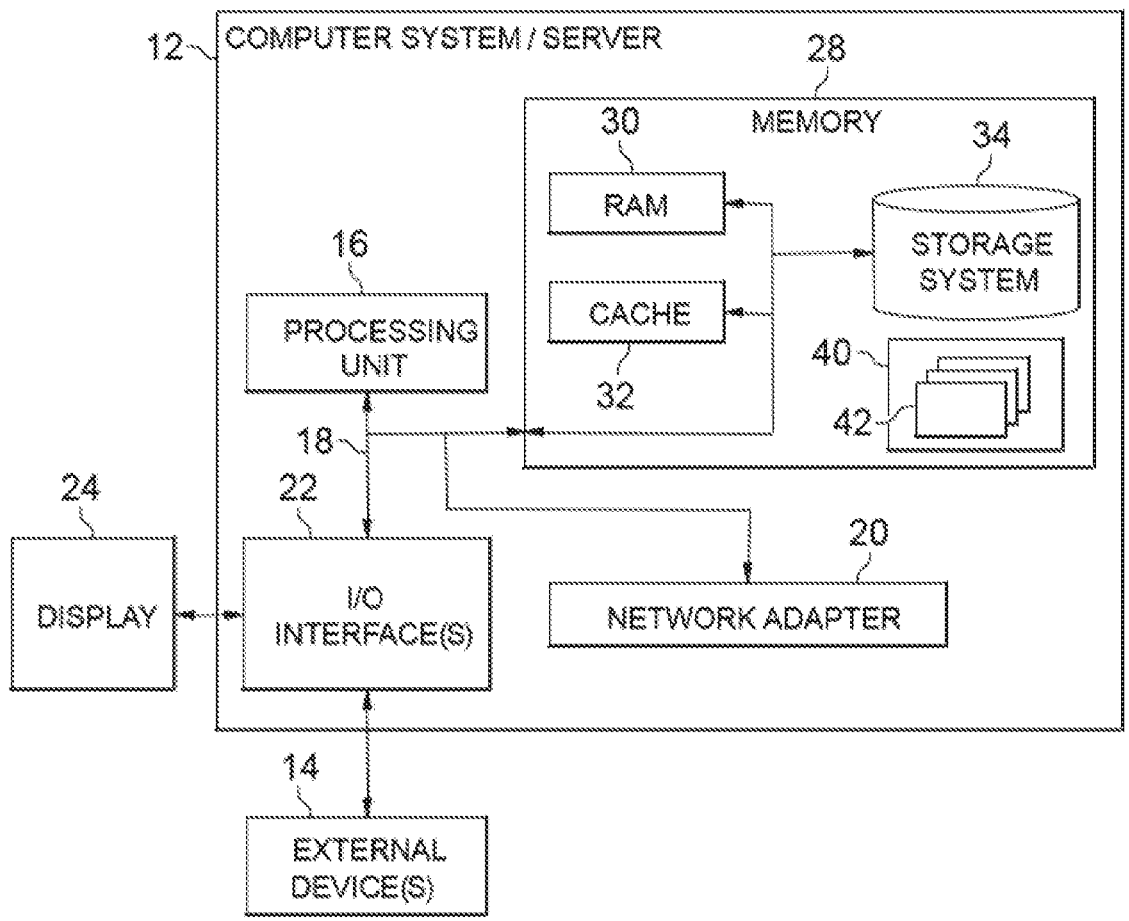
FIG. 4 is a block diagram illustrating a computing system according to one embodiment.

FIG. 4 illustrates a diagram of a computer system/server 12 shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for capturing output of a display device, the system comprising:
   a housing;
   a screen capture device mounted to the housing, wherein the screen capture device configured to capture images shown on the display device and convert the images into a digital signal, the screen capture device includes:
      a first polarizer configured to allow polarized light associated with a first polarization of the first polarizer while blocking light waves of other polarizations,
      a color filter configured to separate the polarized light,
      liquid crystals positioned between the color filter and a second polarizer,
      the second polarizer configured to allow for polarized light associated with a second polarization of the second polarizer;
   a serializer electrically connected to the screen capture device and mounted to the housing, wherein the serializer configured to serialize the digital signal into a serialized digital signal to allow for transmission; and
a display interface electrically connected to the serializer and mounted to the housing, wherein the display interface is configured to transmit the serialized digital signal to an outside device.

2. The system of claim 1, wherein:
the screen capture device further configured to calibrate the images received from the display device to account for color vision deficiency.

3. The system of claim 1, wherein:
the screen capture device further configured to detect defective pixels on the display device and to correct the images received.

4. The system of claim 1, wherein:
the screen capture device further configured to detect defects on a screen of the display device and to correct the images received.

5. The system of claim 1, wherein:
the serializer further configured to continuously serialize the digital signal, wherein the display interface continuously transmits the serialized digital signal.

6. The system of claim 1, further comprising:
a sound capture device mounted to the housing, the screen capture device electrically connected to the screen capture device and the serializer, the sound capture device configured to convert visual sound waves shown on the display device into a digital audio signal, the sound capture device further configured to transmit the digital audio signal to the serializer for serialization.

7. The system of claim 1, wherein the display interface is an HDMI interface.

8. The system of claim 1, wherein the display interface is a display port interface.

9. The system of claim 1, further comprising:
a bracket mounted adjacent to the screen capture device, wherein the bracket holds the display device in place.

10. The system of claim 9 wherein the bracket is mounted to allow for the display device to face away from the outside device, whereby allowing a camera of the display device to capture a displayed output shown on the outside device.

11. A method for capturing output of a display device, the method comprising:
receiving an image of the display device by detecting light being emitted from the display device onto a screen capture device, wherein the image is displayed on the display device and the screen capture device includes:
a first polarizer configured to allow polarized light associated with a first polarization of the first polarizer while blocking light waves of other polarizations,
a color filter configured to separate the polarized light, liquid crystals positioned between the color filter and a second polarizer,
the second polarizer configured to allow for polarized light associated with a second polarization of the second polarizer;
converting the image into a digital signal, wherein the digital signal is digital information of the image;
serializing the digital signal into a serialized digital signal, wherein the serialized digital signal is configured to be transmitted to an outside device; and
transmitting the serialized digital signal to the outside device, whereby the image of the display device is displayed on the outside device.

12. The method of claim 11, further comprising:
calibrating the image to account for color vision deficiency.

13. The method of claim 11, further comprising:
detecting cracks on the display device; and
correcting display errors caused by the cracks within the image.

14. The method of claim 11, further comprising:
detecting defective pixels on the display device; and
correcting the image with detected defective pixels by changing the defective pixels to match colors surrounding the defective pixels.

15. The method of claim 11, further comprising:
detecting a visual sound waves displayed on the display device; and
modulating the detected visual sound waves.

16. The method of claim 11, further comprising:
recording the image as displayed on the outside device.

17. The method of claim 11, further comprising:
projecting the image continuously as the image of the display device is captured.

18. The method of claim 11, further comprising:
comparing the image with a displayed image on the outside device;
detecting differences between the image and the displayed image; and
storing the differences detected.

19. The method of claim 18, further comprising:
projecting the image continuously as the image of the display device is captured.

20. A system for capturing output of a display device, the system comprising:
a housing;
a screen capture device mounted to the housing, wherein the screen capture device configured to capture images shown on the display device and convert the images into a digital signal, the screen capture device includes:
a first polarizer configured to allow polarized light associated with a first polarization of the first polarizer while blocking light waves of other polarizations,
a color filter configured to separate the polarized light, liquid crystals positioned between the color filter and a second polarizer,
the second polarizer configured to allow for polarized light associated with a second polarization of the second polarizer;
a serializer electrically connected to the screen capture device and mounted to the housing, wherein the serializer configured to serialize the digital signal into a serialized digital signal to allow for transmission;
a display interface electrically connected to the serializer and mounted to the housing, wherein the display interface is configured to transmit the serialized digital signal to an outside device, wherein the outside device comprises an outside display screen configured to display images transmitted by the serialized digital signal;
a bracket mounted adjacent to the screen capture device, wherein the bracket holds the display device in place;
a sound capture device mounted to the housing, the screen capture device electrically connected to the screen capture device and the serializer, the sound capture device configured to convert visual sound waves shown on the display device into a digital audio signal, the sound capture device further configured to transmit the digital audio signal to the serializer for serialization;
wherein the display device comprises a display screen and an image capture device, wherein the image capture device is configured to capture images shown on the outside display screen and to record differences between images on the outside display screen and images shown on the display device; and wherein the screen capture device further configured to calibrate the image of the display device to account for color vision deficiency, to detect defective pixels on the display device and to correct the images received, and to detect defects on a screen of the display device and to correct the images received.

* * * * *